US012435592B2

(12) United States Patent
McChesney et al.

(10) Patent No.: US 12,435,592 B2
(45) Date of Patent: Oct. 7, 2025

(54) SELF-CLEANING IMPULSE TURBINE AND BEARING IN FLUID CONTAMINATED WITH SOLIDS

(71) Applicant: Halliburton Energy Services, Inc., Houston, TX (US)

(72) Inventors: Ryan W. McChesney, Carrollton, TX (US); Gordon McLeary, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 18/519,791

(22) Filed: Nov. 27, 2023

(65) Prior Publication Data

US 2025/0172050 A1 May 29, 2025

(51) Int. Cl.

*E21B 31/00* (2006.01)
*E21B 28/00* (2006.01)
*E21B 41/00* (2006.01)
*F01D 25/00* (2006.01)

(52) U.S. Cl.

CPC ............ *E21B 31/005* (2013.01); *E21B 28/00* (2013.01); *E21B 41/0085* (2013.01); *F01D 25/002* (2013.01); *F05D 2260/607* (2013.01)

(58) Field of Classification Search

CPC .... E21B 31/005; E21B 28/00; E21B 41/0085; E21B 43/12; F01D 25/002; F05D 2260/607

See application file for complete search history.

(56) References Cited

U.S. PATENT DOCUMENTS 4,890,682 A * 1/1990 Worrall ................. E21B 31/113 175/298
5,626,200 A * 5/1997 Gilbert ................ E21B 41/0085 175/40
8,201,641 B2 * 6/2012 Allahar ................... E21B 28/00 175/56
9,415,428 B2 8/2016 Gharib et al.
9,506,318 B1 * 11/2016 Brunet .................... E21B 33/16
10,350,614 B2 7/2019 Burford et al.
10,987,704 B2 4/2021 Davies et al.
11,753,894 B1 9/2023 Baghdady et al.
2001/0006108 A1 * 7/2001 Brett ........................ G01V 1/52 166/177.6

(Continued)

FOREIGN PATENT DOCUMENTS

CN 219412545 7/2023

OTHER PUBLICATIONS

"Types of Hydropower Turbines", from the US Department of Energy, accessed Apr. 16, 2025 via https://www.energy.gov/eere/water/types-hydropower-turbines.*

(Continued)

*Primary Examiner* — Blake Michener
(74) *Attorney, Agent, or Firm* — DeLizio, Peacock, Lewin & Guerra LLP

(57) ABSTRACT

An apparatus configured to be positioned in a wellbore formed in a subsurface formation. The apparatus comprises one or more components configured to induce a vibration within a turbine to mitigate debris buildup on a rotor of the turbine, wherein the rotor is configured to rotate about a central axis when a flow of fluid interacts with the turbine.

19 Claims, 5 Drawing Sheets

(56) References Cited

U.S. PATENT DOCUMENTS

| | | | | |
|---|---|---|---|---|
| 2004/0074883 | A1* | 4/2004 | Kilburn | B23K 26/142 219/121.68 |
| 2005/0035096 | A1* | 2/2005 | Kilburn | B23K 26/032 219/121.68 |
| 2007/0194773 | A1* | 8/2007 | Dankert | F01D 25/002 324/71.2 |
| 2009/0266612 | A1* | 10/2009 | Allahar | E21B 7/24 175/55 |
| 2010/0326733 | A1* | 12/2010 | Anderson | E21B 21/103 175/296 |
| 2014/0260307 | A1* | 9/2014 | Dorshimer | F01D 25/002 60/779 |
| 2017/0130578 | A1* | 5/2017 | Skerry | E21B 31/03 |
| 2017/0254182 | A1 | 9/2017 | Gregory et al. | |
| 2018/0156001 | A1* | 6/2018 | Schwendemann | E21B 34/06 |
| 2020/0291773 | A1 | 9/2020 | Turner | |

OTHER PUBLICATIONS

American Heritage Dictionary definition of "turbine", accessed Apr. 15, 2025 via https://ahdictionary.com/.*

* cited by examiner

SELF-CLEANING IMPULSE TURBINE AND BEARING IN FLUID CONTAMINATED WITH SOLIDS

FIELD

Some implementations relate generally to the field of downhole tools positioned in a wellbore and more particularly to the field of mitigating debris buildup on turbines of a downhole tool.

BACKGROUND

Tools may be positioned in a wellbore drilled in a subsurface formation to assist in controlling the flow of fluid in the wellbore. For instance, downhole tools may be utilized to control the flow of reservoir fluid as it flows from the subsurface formation to the surface. Turbines may be disposed on the downhole tools to provide the downhole tools power such that the tools may function accordingly. The turbines may utilize the flow of fluid in the wellbore to rotate about a central axis and generate power for the downhole tools.

BRIEF DESCRIPTION OF THE DRAWINGS

Implementation of the disclosure may be better understood by referencing the accompanying drawings.

DESCRIPTION

Figure 1:
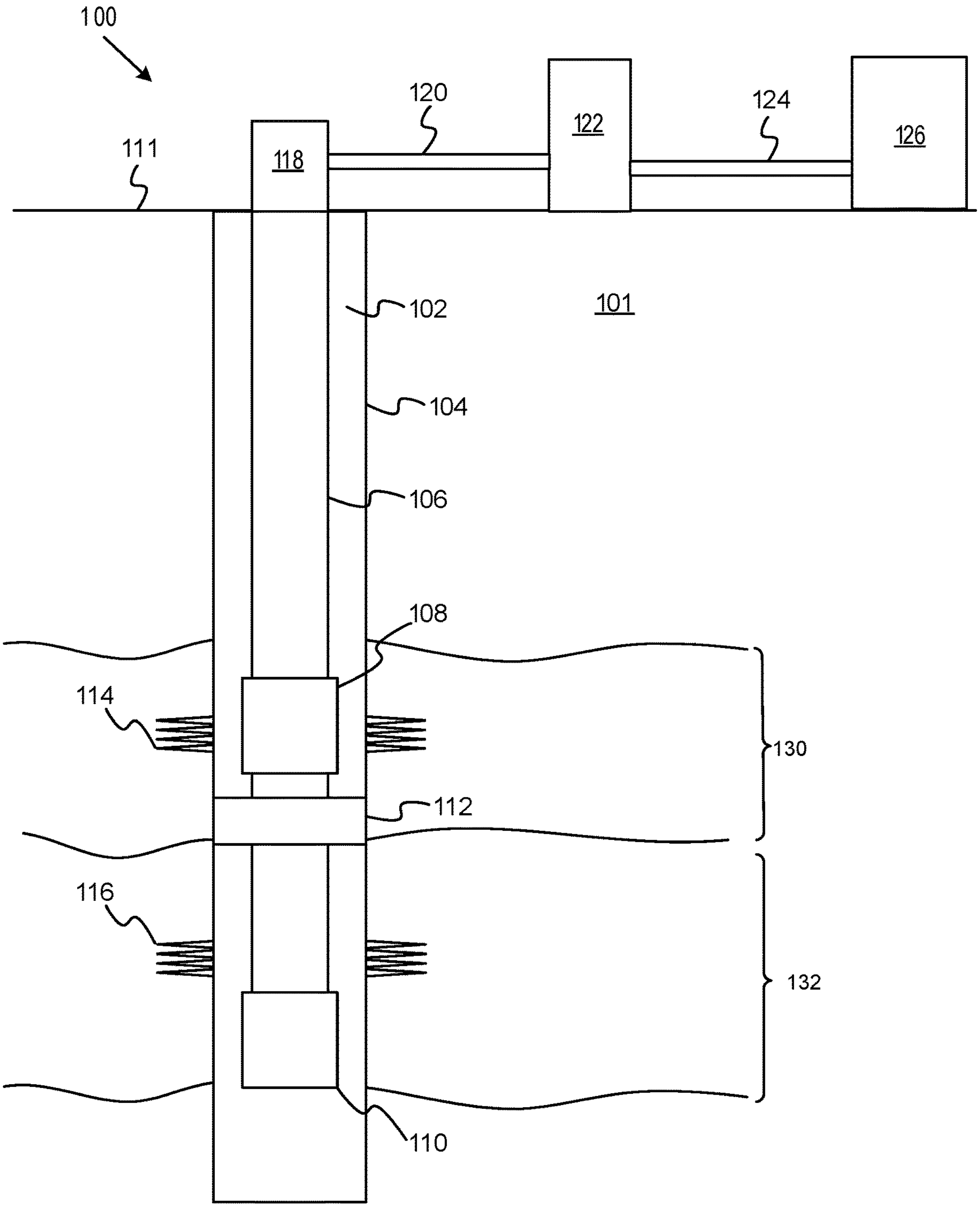
FIG. 1 is a diagrammatic illustration of an example well system, according to some implementations.

The description that follows includes example systems, methods, techniques, and program flows that embody aspects of the disclosure. However, it is understood that this disclosure may be practiced without these specific details. For instance, this disclosure refers to one or more components configured to induce vibrations for an impulse turbine in a wellbore. Aspects of this disclosure can also be applied to other components and/or a combination of components configured to induce vibrations for an impulse turbine positioned in wellbore. For clarity, some well-known instruction instances, protocols, structures, and techniques have been omitted.

Example implementations relate to one or more components of an impulse turbine configured to mitigate debris buildup. In some implementations, a downhole tool, such as an inflow control device (ICD), may be positioned in a wellbore formed in a subsurface formation. The downhole tool may include a turbine, such as an impulse turbine, that may be utilized to generate power for the downhole tool. As fluid flows from the subsurface formation, into the wellbore, and ultimately to the surface, the fluid may interact with the impulse turbine such that a rotor of the impulse turbine rotates about its central axis. In some implementations, the fluid may be contaminated with debris such as sand from the subsurface formation and/or hydraulic fracturing operations, scale, magnetic particles, etc. The debris may build up on the components of the turbine, such as the rotor. The debris may build up to amounts such that the turbine may be negatively impacted. For example, the debris may prevent the rotor from rotating. Conventional approaches may design one or more of the components including the bearings, shaft, blades, rotor, etc. to reduce debris buildup such as coating the components in materials to inhibit prevent debris buildup. However, additional measures may be taken to ensure normal operations of the turbine.

In some implementations, an impulse turbine positioned in a wellbore may include one or more components configured to induce a vibration within the turbine. The vibrations induced within the turbine may mitigate and/or prevent debris building up on surfaces of the components such as the faces of the rotor, the bearings, etc. For example, the vibrations may shed debris buildup from the rotor. The one or more components may induce vibrations via sources including an imbalance in the rotor, turbulence in the fluid surrounding the rotor, a pressure variance in the turbine, etc. For example, one or more components may be positioned proximate to and/or on the rotor to induce certain amplitude and frequency vibrations on the rotor to prevent and/or mitigate debris buildup on the rotor. In some implementations, the one or more components may temporarily induce vibrations within the turbine. For example, the components may induce vibrations for a period of time during occasions such as at initial startup, at scheduled time intervals, when turbine performance indicates debris buildup, etc. By mitigating debris buildup via vibrations, the turbine may be able to maintain bearing speed during the life of the wellbore operation, clearing debris as it may build up on the turbine components. Additionally, the one or more components may aid in startup of the turbine if the fluids (such as mud) present in the wellbore while the turbine was positioned in the wellbore were contaminated with debris.

Example Systems

FIG. 1 is a diagrammatic illustration of an example well system, according to some implementations. In particular, a well system 100 of FIG. 1 includes a wellbore 102 in a subsurface formation 101. The wellbore 102 includes casing 104 and number of perforations 114, 116 being made in the casing 104. Each set of perforations 114, 116 is located in a respective reservoir 130, 132 to allow reservoir fluids (i.e., oil, water, and gas) from the respective reservoirs 130, 132 to flow into the wellbore 102 and into the tubular string 106 (the production tubing). The tubular string 106 includes a packer 112 that may prevent the comingling of fluids produced from the reservoirs 130, 132 in the wellbore 102. A production assembly 108 may allow the inflow of fluid produced from the reservoir 130 into the tubular string 106. Likewise, a production assembly 110 may allow the inflow of fluid produced from the reservoir 132 into the tubular string 106.

Each of the production assemblies 108, 110 may include one or more downhole tools (not pictured). In some implementations, the downhole tools may be configured to control the flow of fluid produced from the reservoirs 130, 132 and into the tubular string 106. The downhole tool may include one or more inflow control devices (such as an electric ICD, density ICD, etc.), one or more valves (e.g., a gas lift valve, a solenoid valve, etc.), etc. to control flow as fluid flows into the tubular string 106. In some implementations, the production assemblies 108, 110 may include one or more generators configured to supply power for the downhole tools. For example, a generator may supply power to an ICD. In some implementations, the generator may include one or more turbines that may rotate about a central axis when the fluid flowing from the wellbore 102 interacts with the turbine. In some implementations, each of the production assemblies 108, 110 may also include electronics to control (e.g., for controlling timing, directionality, and/or voltage threshold for powering and/or activating the downhole tool) the respective downhole tools. The electronics may utilize the power output from the generator to control the downhole tools.

A flowline 120 coupled to the wellhead 118 of wellbore 102 and a separator 122 may allow the fluid produced up the tubular string 106 to flow to the separator 122. The separator 22 may be designed to separate the phases of the fluid produced from the wellbore 102. For instance, oil, water, and gas may be separated from each other after passing through the separator 122. The aggregate of fluid produced from wellbore 102 may then flow to a tank battery, via flowline 124, that may include components such as storage tank 126, to store the produced fluid.

The well system 100 of FIG. 1 depicts an example wellbore where an impulse turbine may be positioned. The self-cleaning turbine described herein may be positioned in any suitable wellbore configurations and/or environment where there may be dirty fluid (i.e., fluid with artificial and/or natural debris that may impact the functionality of the turbine).

Example Turbine

Examples of a turbine are now described. The turbines are described in reference to the production assembly 108 and/or 110 of FIG. 1

Figure 2:
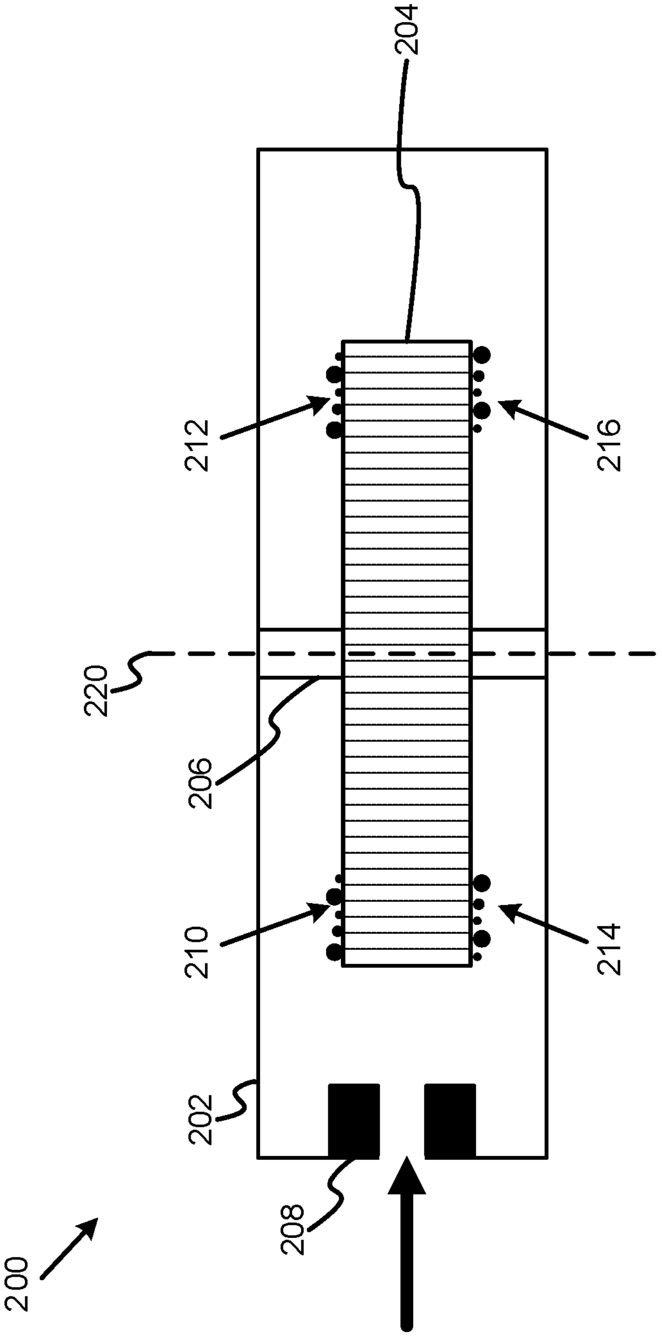
FIG. 2 is a schematic of an example impulse turbine, according to some implementations.

FIG. 2 is a schematic of an example impulse turbine, according to some implementations. In particular, FIG. 2 includes a cross-sectional view of an impulse turbine 200. The impulse turbine 200 may be coupled to components of a downhole tool positioned in a wellbore (such as a generator on the production assembly 108 and/or 110 of FIG. 1). The impulse turbine 200 includes a rotor 204 within a housing 202. Fluid may flow into the impulse turbine 200 via a nozzle 208. As the fluid flows into the impulse turbine 200, the fluid may interact with the blades of the rotor 204, resulting in the rotor 204 rotating about its central axis 220. A shaft 206 may be positioned at the central axis 220 and coupled with the rotor 204. In some implementations, the shaft 206 may be coupled with other components external to the impulse turbine (not shown), transferring the rotational motion to the external components. In some implementations, the shaft 206 may remain stationary when the rotor 204 rotates about the central axis 220. The shaft may include bearings (not shown) that may allow the rotor 204 to rotate about the central axis 220. In some implementations, the bearing may include polycrystalline diamond bearings, ceramic bearings, etc. Any suitable material for the bearings and/or shaft may be utilized to withstand (at least temporary and/or constant) vibrations induced within the impulse turbine 200. For example, the bearings and/or shaft 206 may be designed with a suitable material that may be able to withstand an imbalance on the rotor 204.

The fluid that enters the impulse turbine 200 may include debris such as sand, scale, magnetic particles, etc. In some implementations, the debris may build up within the impulse turbine, inhibiting rotational motion of the rotor 204. Debris may build up within different areas of the impulse turbine 200 such as the faces of the rotor 204, in between the blades of the rotor 204, bridge off between the rotor 204 and the housing 202, on the bearings, etc. For example, if a rotor includes magnets, magnetic debris buildup 210-214 may collect on the faces of the rotor 204.

In some implementations, components of the impulse turbine 200 such as the rotor 204, shaft 206, bearings, etc. may be coated with material to assist in preventing debris buildup. For example, the surfaces of the rotor 204, bearings, shaft 206, etc. may be coated with any suitable material that may at least partially prevent debris buildup (such as scale) on the surface of the impulse turbine components. The materials may include a nickel plating with polytetrafluoroethylene (PTFE) that may inhibit scale and/or other debris buildup on the surface of the components. In some implementations, the coating material may be uniform across all components within the impulse turbine 200, different coating may be utilized on different components within the impulse turbine 200, etc. For example, the top and/or bottom face of the rotor 204 may be coated with a different material than the coating material on the blades of the rotor 204 due to the high flow velocity the blades may experience as the fluid enters the impulse turbine 200 via the nozzle 208.

Figure 3:
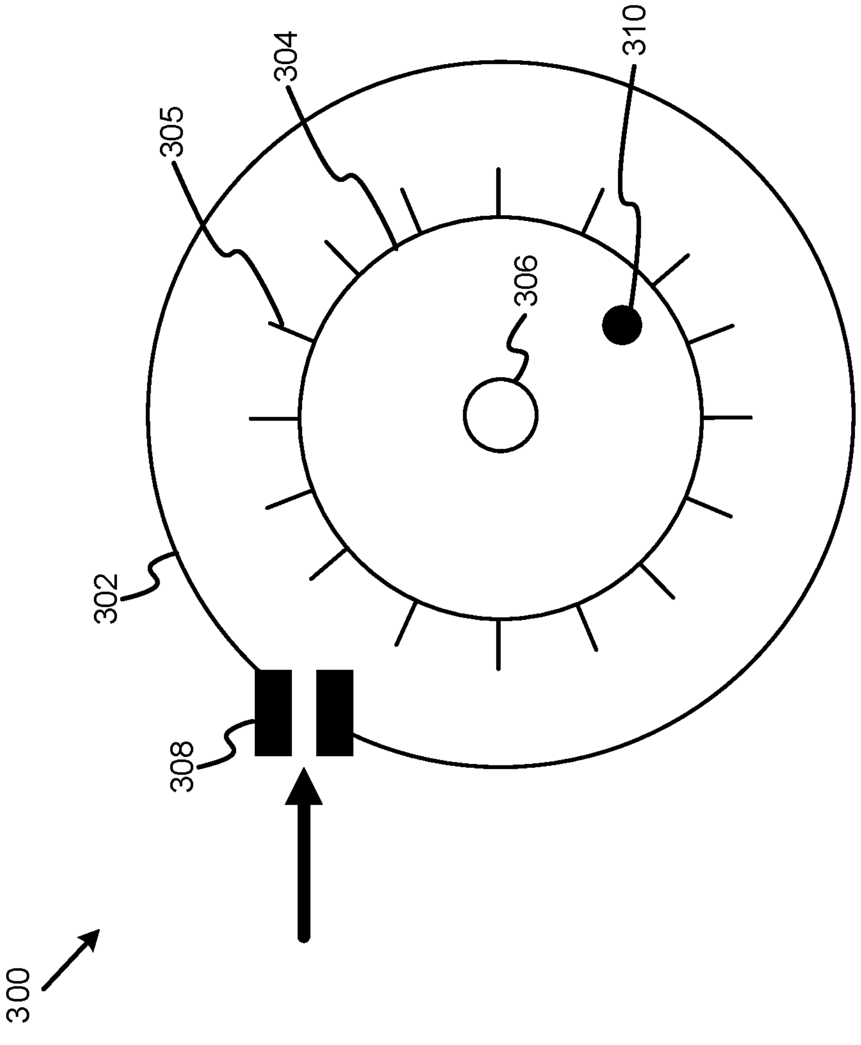
FIG. 3 is a schematic of an example impulse turbine, according to some implementations.

FIG. 3 is a schematic of an example impulse turbine, according to some implementations. In particular, FIG. 3 includes an overhead view of an impulse turbine 300 configured to mitigate debris buildup (as shown in FIG. 2) via vibrations. The configuration of the impulse turbine 300 may be similar to the impulse turbine 200 of FIG. 2. For example, a rotor 304 may be positioned within a housing 302. Fluid may flow into the impulse turbine 300 via a nozzle 308. The fluid flow may interact with the blades of the rotor 304, such as blade 305, resulting in the rotor 304 rotating about a central axis. A shaft 306 may be positioned in the center of the rotor 304. In some implementations, the shaft 306 may include bearings (not pictured) that may allow the rotor 304 to rotate about the central axis.

One or more components may be positioned on the rotor to induce a vibration on the rotor. For example, a weight 310 may be positioned on the rotor and at a distance radially outward from the central axis. The weight may create an imbalance in the rotor 304 as the rotor 304 rotates via the flow of the fluid. The imbalance may induce a vibration on the rotor 304 that may mitigate debris buildup from the rotor 304 and/or other components within the impulse turbine 300. For example, the vibration induced by the weight 310 may shed magnetic debris from the rotor 304 that may have collected on the faces of the rotor 304 if the rotor included magnets.

The position of the weight 310 on the rotor 304 relative to the central axis may be at any suitable position on the rotor 304. For example, weight 310 may be positioned radially outward from the central axis of the rotor 304 to induce a desired vibration frequency and/or amplitude. In some implementations, the vibration frequency and/or amplitude may depend on the components of the impulse turbine such as the rotor, 304, shaft 306, bearings, etc. For example, vibration frequency and/or amplitude may be induced to a desired level such that the shaft 306 may be able to sustain the vibrations for a specified period of time without failing (such as wear, cracking, bending, etc.). The desired level of the vibration frequency and/or amplitude may be the natural vibration frequency and/or amplitude of one or more components (bearings, shaft 306, etc.).

In some implementations, the weight 310 may be able to detach from the rotor 304. For example, the weight 310 may be positioned on the rotor 304 when the impulse turbine 300 is installed in a wellbore. Upon startup, the weight 310 may induce vibrations on the rotor 304 to assist in mitigating any debris that may have collected in the impulse turbine 300 during installation (such as debris from mud or any fluid present in the wellbore during installation). The weight may then detach from the rotor 304 after debris buildup has been mitigated. For instance, the weight 310 may be configured to dissolve when exposed to downhole conditions such as fluids produced from the reservoir or downhole temperatures, detach at a specified rotation frequency of the rotor 304, etc.

Figure 4:
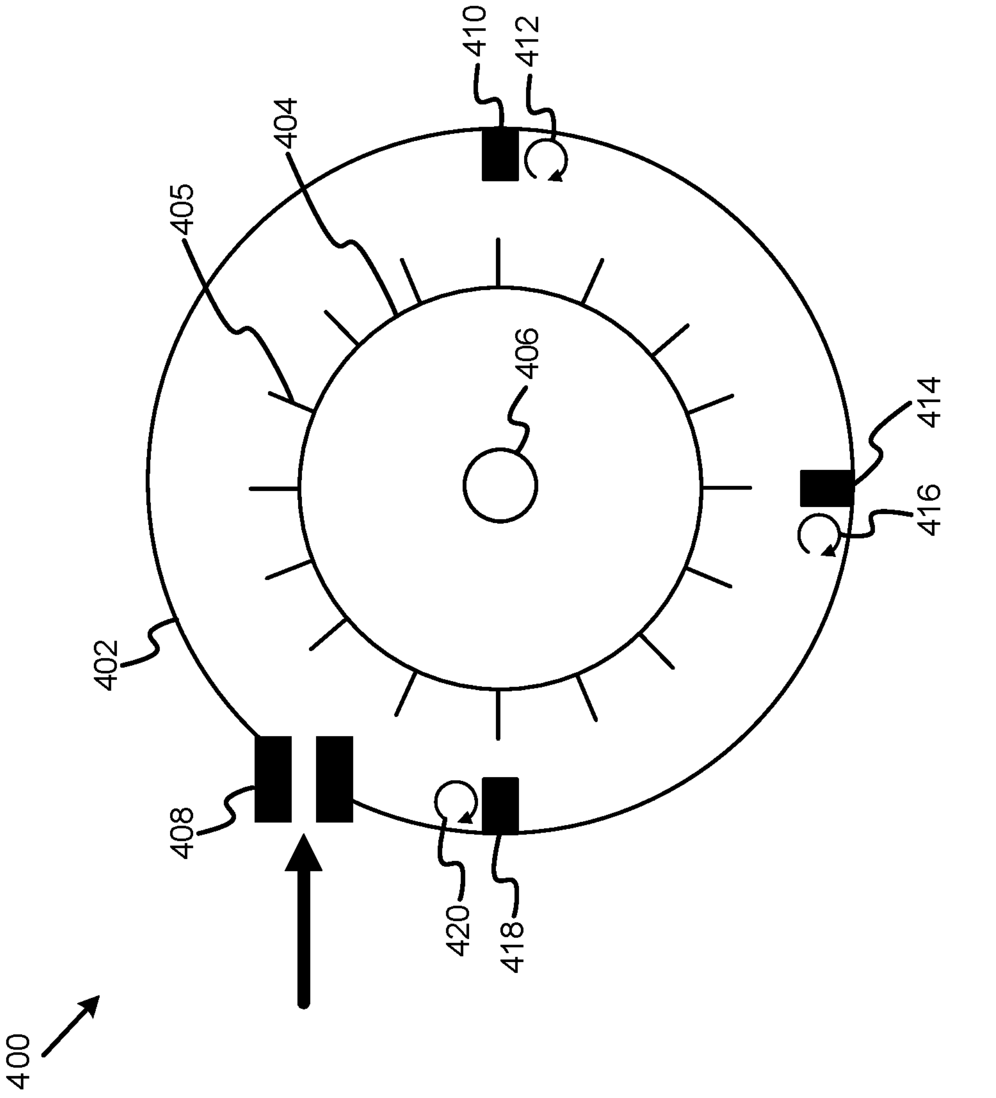
FIG. 4 is a schematic of an example impulse turbine, according to some implementations.

FIG. 4 is a schematic of an example impulse turbine, according to some implementations. In particular, FIG. 4 includes an overhead view of an impulse turbine 400 configured to mitigate debris buildup (as shown in FIG. 2) via vibrations. The configuration of the impulse turbine 400 may be similar to the impulse turbine 200 of FIG. 2 and/or the impulse turbine 300 of FIG. 3. For example, a rotor 404 may be positioned within a housing 402. Fluid may flow into the impulse turbine 400 via a nozzle 408. The fluid flow may interact with the blades of the rotor 404, such as blade 405, resulting in the rotor 404 rotating about a central axis. A shaft 406 may be positioned in the center of the rotor 404. In some implementations, the shaft 406 may include bearings (not pictured) that may allow the rotor 304 to rotate about the central axis.

In some implementations, one or more fins, such as fins 410, 414, and 418, may be positioned in the flow path of the fluid between the housing 402 and the rotor 404. As the fluid flows through the impulse turbine 400, the flow may be disrupted by the fins 410, 414, and 418 which may generate unstable vortexes 412, 416, and 420 downstream of the respective fins 410, 414, and 418. The unstable vortexes 412, 416, and 420 may create a pressure imbalance in the fluid within the impulse turbine, inducing a vibration on the rotor 404 to mitigate and/or prevent any debris buildup within the impulse turbine 400 such as on the rotor 404, the bearings, etc. For example, the pressure imbalance may induce a vibration through the fluid within the impulse turbine. The vibrations propagating through the fluid may impact debris buildup on the rotor 404, effectively mitigating the debris from the rotor 404.

FIG. 4 includes 3 fins 410, 414, and 418 with the fins 410 and 418 approximately equally spaced from the fin 414. Any suitable number of fins may be utilized. For example, 1 fin, 4 fins, 9 fins, etc. may be utilized to induce a vibration. Additionally, and/or alternatively, the fins may be equally spaced and/or not equally spaced. The fins 410, 414, and 418 of FIG. 3 are depicted against the housing 402. The fins may be positioned at any suitable location within the impulse turbine.

In some implementations, the fins 410, 414, and 418 may temporarily create unstable vortexes 412, 416, and 420, respectively. For example, the fins 410, 414, and 418 may be configured to retract out of the flow of the fluid such that the magnitude of the unstable vortexes 412, 416, and 420 may be controlled. For example, to temporarily induce a vibration, the fins 410, 414, and 418 may extrude into the flow path. After a time period, the fins 410, 414, and 418 may retract to eliminate the unstable vortexes 412, 416, and 420 and effectively stopping the vibrations induced by the unstable vortexes 412, 416, and 420. Alternatively, the distance in which the fins 410, 414, and 418 extrude into the fluid may be controlled to control the magnitude of the vibrations. For example, the vibration frequency and/or amplitudes may be adjusted to levels sufficient for the components to withstand for a period of time without failing and additionally mitigate the debris buildup that may be present on components of the impulse turbine 400. In some implementations, the fins 410, 414, and 418 may be deployed based on the rotational speed of the rotor 404. For example, during a drawdown period of the wellbore, the rotational speed of the rotor 404 may increase. Accordingly, the fins 410, 414, and 418 may extrude as the rotational speed of the rotor 404 increases, is greater than a rotational speed threshold, etc. to induce vibrations within the impulse turbine 400. In some implementations, the fins 410, 414, and 418 may be deployed into the flow path via springs or other suitable components.

In some implementations, other components may be utilized to induce vibrations within an impulse turbine. For example, the nozzle of the impulse turbine (such as nozzle 208 of FIG. 2, nozzle 308 of FIG. 3, and nozzle 408 of FIG. 4) may be configured to flutter as fluid flows through the nozzle to induce turbulence in the flow and subsequently induce vibrations. Alternatively, a pulse electromagnet may be utilized to disrupt the flow stream and subsequently induce vibrations.

Example Operations

Example operations for inducing vibrations to mitigate debris buildup in an impulse turbine are now described in reference to FIG. 2, FIG. 3, and FIG. 4.

Figure 5:
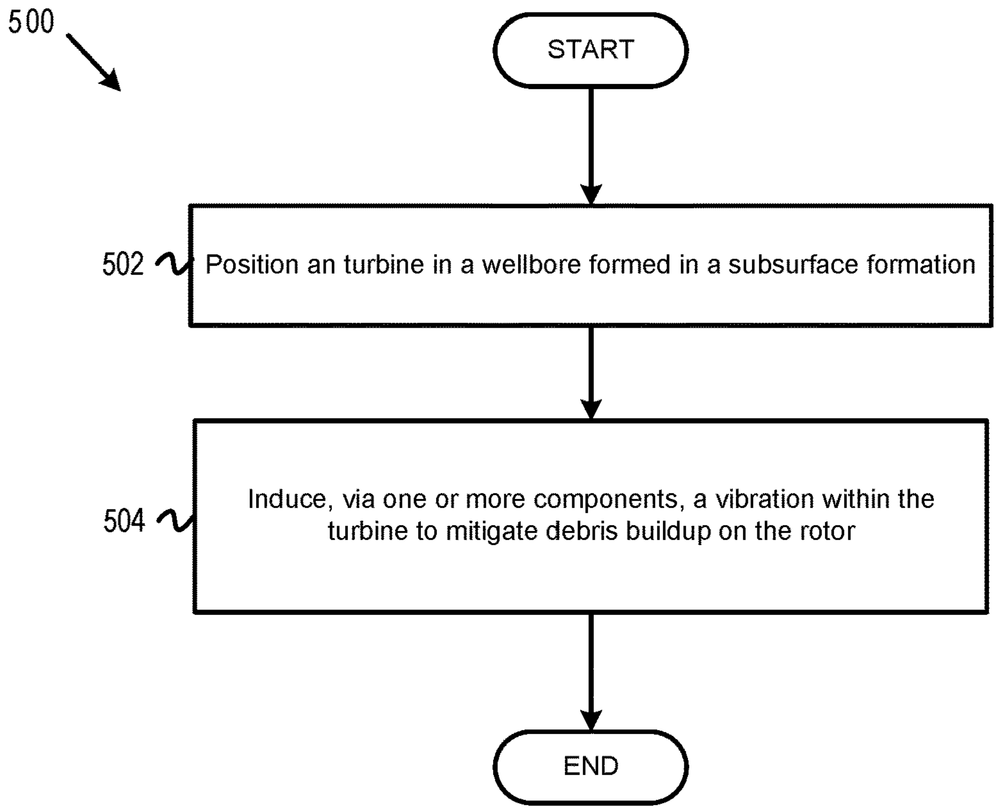
FIG. 5 depicts a flowchart of example operations for inducing vibrations in an impulse turbine, according to some implementations.

FIG. 5 depicts a flowchart of example operations for inducing vibrations in an impulse turbine, according to some implementations. FIG. 5 depicts a flowchart 500 of operations to induce vibrations within an impulse turbine to mitigate debris buildup on the rotor. The operations of flowchart 500 are described in reference to the production assemblies 108, 110 of FIG. 1, impulse turbine 200 of FIG. 2, impulse turbine 300 of FIG. 3, impulse turbine 400 of FIG.

At block 502, a turbine may be positioned in a wellbore formed in a subsurface formation. In some implementations, the turbine may be an impulse turbine. The turbine may be a part of and/or coupled to a downhole tool such as an ICD.

At block 504 one or more components may induce a vibration within the turbine to mitigate debris buildup on the rotor. In some implementations, the vibrations may mitigate debris buildup on other components of the turbine such as the bearings. The one or more components may include one or more components suitable of for inducing vibrations such as components positioned on the rotor (such as weight 310 of FIG. 3), components positioned proximate the rotor (such as the fins 410, 414, and 418 of FIG. 4), a nozzle configured to flutter, a pulse electromagnet, etc. In some implementations, the one or more components may temporarily induce vibrations.

While the aspects of the disclosure are described with reference to various implementations and exploitations, it will be understood that these aspects are illustrative and that the scope of the claims is not limited to them. In general, techniques for inducing vibrations in an impulse turbine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

Example Implementations

Implementation #1: An apparatus configured to be positioned in a wellbore formed in a subsurface formation comprising: one or more components configured to induce a vibration within a turbine to mitigate debris buildup on a rotor of the turbine, wherein the rotor is configured to rotate about a central axis when a flow of fluid interacts with the turbine.

Implementation #2: The apparatus of Implementation #1, wherein the one or more components are configured to induce via sources including vibration via imbalance in the rotor, turbulence in the fluid within the turbine, and pressure variance in the turbine.

Implementation #3: The apparatus of Implementation #1 or 2, wherein the debris buildup includes magnetic debris and non-magnetic debris.

Implementation #4: The apparatus of any one or more of Implementation #1-3, wherein the one or more components temporarily induce the vibration.

Implementation #5: The apparatus of any one or more of Implementation #1-4, wherein the one or more components includes one or more weights coupled to the rotor to induce an imbalance in the rotor when rotating about the central axis.

Implementation #6: The apparatus of Implementation #5, wherein the one or more weights are positioned on the rotor radially outward from the central axis.

Implementation #7: The apparatus of any one or more of Implementation #1-6, wherein the one or more components includes one or more fins proximate the rotor to induce a pressure imbalance in the fluid surrounding the turbine.

Implementation #8: The apparatus of any one or more of Implementation #1-7, wherein the one or more components includes a nozzle configured to induce turbulence in the fluid surrounding the turbine.

Implementation #9: The apparatus of any one or more of Implementation #1-8, wherein the one or more components includes a pulse electromagnet.

Implementation #10: The apparatus of any one or more of Implementation #1-9, wherein the turbine includes an impulse turbine.

Implementation #11: A system comprising: a turbine configured to be positioned in a wellbore formed in a subsurface formation, wherein a rotor of the turbine is configured to rotate about a central axis when a flow of fluid interacts with the turbine; and one or more components configured to induce a vibration within the turbine to mitigate debris buildup on the rotor.

Implementation #12: The system of Implementation #11, wherein the one or more components are configured to induce via sources including vibration via imbalance in the rotor, turbulence in the fluid within the turbine, and pressure variance in the turbine.

Implementation #13: The system of Implementation #11 or 12, wherein the debris buildup includes magnetic debris and non-magnetic debris.

Implementation #14: The system of any one or more of Implementation #11-13, wherein the one or more components temporarily induce the vibration.

Implementation #15: The system of any one or more of Implementation #11-14, wherein the one or more components includes one or more weights coupled to the rotor to induce an imbalance in the rotor when rotating about the central axis.

Implementation #16: The system of Implementation #15, wherein the one or more weights are positioned on the rotor radially outward from the central axis.

Implementation #17: The system of any one or more of Implementation #11-16, wherein the one or more components includes one or more fins proximate the rotor to induce a pressure imbalance in the fluid surrounding the turbine.

Implementation #18: A method comprising: positioning a turbine in a wellbore formed in a subsurface formation, wherein a rotor of the turbine is configured to rotate about a central axis when a flow of fluid interacts with the turbine; and inducing, via one or more components, a vibration within the turbine to mitigate debris buildup on the rotor.

Implementation #19: The method of Implementation #18, wherein the one or more components are configured to induce via sources including vibration via imbalance in the rotor, turbulence in the fluid within the turbine, and pressure variance in the turbine.

Implementation #20: The method of Implementation #18 or #19, wherein the debris buildup includes magnetic debris and non-magnetic debris.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. An apparatus configured to be positioned in a wellbore formed in a subsurface formation comprising:

one or more components configured to induce a vibration within an impulse turbine to mitigate debris buildup on a rotor of the impulse turbine, wherein the rotor is configured to rotate about a central axis when a flow of fluid interacts with the impulse turbine.

2. The apparatus of claim 1, wherein the one or more components are configured to induce the vibration via imbalance in the rotor, turbulence in the fluid within the impulse turbine, and pressure variance in the impulse turbine.

3. The apparatus of claim 1, wherein the one or more components are configured to induce the vibration to mitigate magnetic debris buildup on the rotor.

4. The apparatus of claim 1, wherein the one or more components temporarily induce the vibration.

5. The apparatus of claim 1, wherein the one or more components includes one or more weights coupled to the rotor to induce an imbalance in the rotor when rotating about the central axis.

6. The apparatus of claim 5, wherein the one or more weights are positioned on the rotor radially outward from the central axis.

7. The apparatus of claim 1, wherein the one or more components includes one or more fins proximate the rotor to induce a pressure imbalance in the fluid surrounding the turbine.

8. The apparatus of claim 1, wherein the one or more components includes a nozzle configured to induce turbulence in the fluid surrounding the rotor.

9. The apparatus of claim 1, wherein the one or more components are configured to induce the vibration to mitigate non-magnetic debris buildup on the rotor.

10. A system comprising:

An impulse turbine configured to be positioned in a wellbore formed in a subsurface formation, wherein a rotor of the impulse turbine is configured to rotate about a central axis when a flow of fluid interacts with the impulse turbine; and one or more components configured to induce a vibration within the impulse turbine to mitigate debris buildup on the rotor.

11. The system of claim 10, wherein the one or more components are configured to induce the vibration via imbalance in the rotor, turbulence in the fluid within the impulse turbine, and pressure variance in the turbine.

12. The system of claim 10, wherein the one or more components are configured to induce the vibration to mitigate magnetic debris buildup on the rotor.

13. The system of claim 10, wherein the one or more components temporarily induce the vibration.

14. The system of claim 10, wherein the one or more components includes one or more weights coupled to the rotor to induce an imbalance in the rotor when rotating about the central axis.

15. The system of claim 14, wherein the one or more weights are positioned on the rotor radially outward from the central axis.

16. The system of claim 10, wherein the one or more components includes one or more fins proximate the rotor to induce a pressure imbalance in the fluid surrounding the turbine.

17. A method comprising:

positioning an impulse turbine in a wellbore formed in a subsurface formation, wherein a rotor of the impulse turbine is configured to rotate about a central axis when a flow of fluid interacts with the impulse turbine; and inducing, via one or more components, a vibration within the impulse turbine to mitigate debris buildup on the rotor.

18. The method of claim 17, wherein the one or more components are configured to induce the vibration via imbalance in the rotor, turbulence in the fluid within the turbine, and pressure variance in the turbine.

19. The method of claim 17, wherein the one or more components are configured to induce the vibration to mitigate magnetic debris buildup on the rotor.

* * * * *